United States Patent Office.

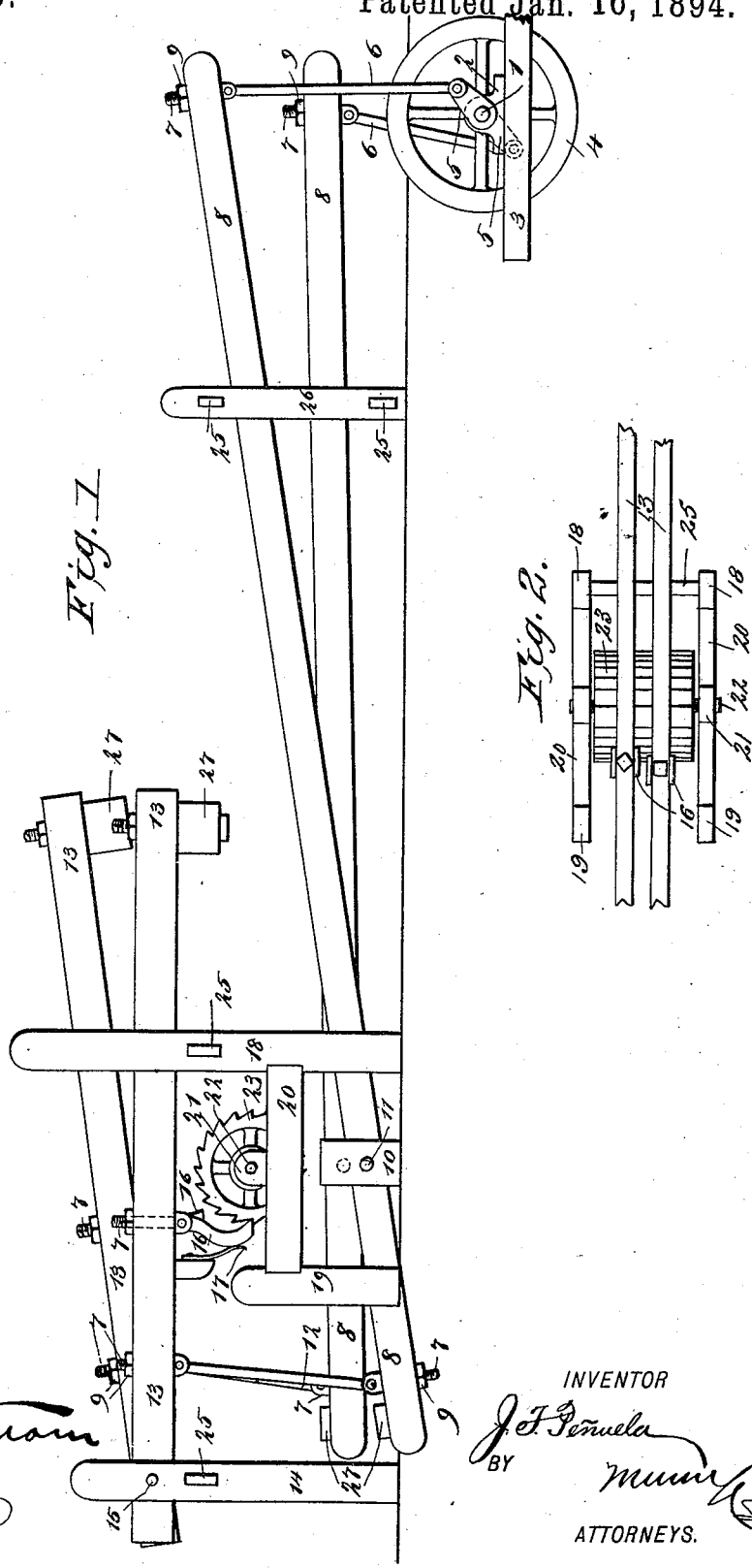

JOSÉ T. PENUELA, OF CIUDAD DEL TOCUYO, VENEZUELA.

MECHANICAL MOVEMENT.

SPECIFICATION forming part of Letters Patent No. 512,896, dated January 16, 1894.

Application filed June 24, 1893. Serial No. 478,730. (No model.) Patented in Venezuela April 3, 1891.

*To all whom it may concern:*

Be it known that I, JOSÉ T. PENUELA, a citizen of the Republic of Venezuela, and a resident of Ciudad del Tocuyo, in the State of Lara and Republic of Venezuela, have invented a new and useful Mechanical Movement, (for which I have obtained a patent in Venezuela, dated April 3, 1891,) of which the following is a full, clear, and exact description.

Reference is to be had to the accompanying drawings, in which—

Figure 1 is a side elevation and Fig. 2 is a detail plan view of the improvement.

The object of the invention is to provide a mechanism which is to be connected with a drive shaft and with the machine to be driven thereby, said intermediate mechanism being so constructed that the driven shaft, *i. e.*, the main shaft of the machine, will be turned with greater power than the driving shaft of the actuating engine or machine, and will thus be capable of overcoming a greater resistance.

The invention has been especially designed for employment in connection with machinery for extracting cane juice in the manufacture of cane sugar, but will be applicable to crushing mills and many other machines where a great power or pressure is required.

The invention consists of a combination of cranks, levers, and falls, as will be fully described hereinafter.

The features of novelty of the mechanism will be pointed out in the claims.

As illustrated in the accompanying drawings, the drive shaft 1 is journaled in bearings 2, secured to a suitable frame 3.

4 is a fly-wheel mounted on the drive shaft 1. The latter may be operated by a steam engine, a hydraulic engine or any natural or animal power. On the shaft 1 are secured two cranks 5, extending on diametrically opposite sides of the shaft. To the free ends of the said cranks 5, are pivotally connected the connecting rods 6, which, at their upper ends, have a pivotal connection with screw bolts 7. These screw bolts are rigidly secured to the ends of levers 8, by means of nuts 9. It will be understood that the levers are located and adapted to oscillate in different planes, as the cranks 5 and connecting rod 6 extend on opposite sides of the fly-wheel 4.

Each of the levers 8 is fulcrumed in two parallel standards 10, the fulcrum of the front lever being indicated at 11. Those arms of the levers which are connected with the connecting rods 6 are considerably longer than the oppositely extending arms of the levers.

Screw bolts 7 are secured to the ends of the shorter arms of the levers 8, and are held in place by means of nuts 9. Connecting rods 12 are pivotally connected with the said screw bolts and with similar screw bolts 7 secured to the pawl levers 13. These levers, which are in vertical alignment with the levers 8, are pivoted near their ends in standards 14, as shown at 15. Pawls 16 are pivotally connected with screw bolts 7 secured to the levers 13, and springs 17 are likewise secured to the said levers so as to normally be in contact with the pawls. The rods 12 are connected to the levers 13 about midway between the pawls 16 and the pivot 15.

Standards 18 are provided for guiding the levers 13. Said standards, in conjunction with a post 19, also support a frame 20, carrying a bearing 21, in which is journaled the shaft 22 of a ratchet wheel 23. This wheel is so located and constructed that its teeth are adapted to be engaged by both pawls 16, as will be seen in Fig. 2 and the teeth of the ratchet wheel are so formed that the pawls will turn the wheel 23 during their downward movement. The shaft 22 is connected with the machinery to be driven, either directly or by means of gear wheels or belts and pulleys.

Cross bars 25 are provided for bracing the standards 14 and 18. Standards 26 serve to guide the levers 8, and are also connected by cross bars 25. Weights 27 are secured to the ends of the levers 8 and 13 to facilitate their motion.

The operation of the mechanism will be obvious:—When the shaft 1 is rotated, the cranks 5 will be carried around, and an oscillating motion will be imparted to the levers 8 by means of the connecting rods 6. This oscillating motion will be transmitted to the pawl levers 13 by means of the connecting rods 12, and the pawls 16, being pressed into engagement with the ratchet wheel 23 by the springs 17, will impart a rotary motion to the shaft 22. It will be understood that the pawls 16 alternately actuate the ratchet wheel 23, and while one of the said pawls moves upward, the other descends with its lever 13. As the fulcrums of the levers 13 are located near their ends, the force of gravity will be sufficient to effect their downward movement, and the power exerted by the levers 8 will be added to that furnished by the weight of the levers 13 and weights 27. In consequence thereof, a considerable power will be transmitted to the ratchet wheel 23 and shaft 22 at the downward or operative movement of the pawl levers 13.

I do not confine myself to the exact form of construction illustrated in the drawings and described with reference thereto, as various changes can be made without departing from the nature of my invention. Eccentrics may be substituted for the cranks 5, and the location of the several parts of the device may be altered, provided that the connection and operation of the parts shall be the same as above described. It will also be obvious that the number of cranks 5 and levers 8 and 13 connected therewith may be increased to insure a more uniform rotation of the shaft 22. It will be understood that these cranks will preferably form equal angles with each other, for instance, if three cranks are employed, they will be set at an angle of one hundred and twenty degrees to each other.

Having thus described my invention, I claim as new and desire to secure by Letters Patent—

1. A mechanical movement, the same comprising a drive shaft, a first set of levers connected therewith and adapted to receive an oscillating motion therefrom, a second set of oscillating levers connected with the first set of oscillating levers, each lever of the second set being adapted to turn on an essentially horizontal pivot located at one end of the lever, whereby the said levers will have a tendency to swing down by their own weight, substantially as described, a driven shaft and a driving connection between the said shaft and the said second set of oscillating levers, the driving connection being located on the same side of the pivot as the connection with the first set of oscillating levers, as set forth.

2. A mechanical movement, the same comprising a drive shaft, a first set of oscillating levers connected therewith, and adapted to receive an oscillating motion therefrom, a second set of oscillating levers connected with the first set of oscillating levers, each lever of the second set having a horizontal pivot at one of its ends and a weight near its opposite end, whereby the said levers will swing down by gravity, substantially as described, pawls carried by each lever of the second set at about the center thereof, a driven shaft, and a single ratchet wheel secured thereto and adapted to be engaged by each of the said pawls to be rotated thereby, as set forth.

3. A mechanical movement, the same comprising a drive shaft, cranks secured thereto and adapted to rotate in different planes, connecting rods pivotally connected with the said cranks, oscillating levers the longer arms whereof have a pivotal connection with the said connecting rods, another set of connecting rods extending in an essentially vertical plane and having a pivotal connection with the shorter arms of the said oscillating levers, weighted pawl levers pivotally connected with the second set of connecting rods to oscillate in a vertical plane and pivoted at one of their ends, whereby the said pawl levers will swing down by gravity, substantially as described, spring-pressed pawls carried by the said levers on the same side of their pivot as the pivotal connection with the said connecting rods, yet at a greater distance from the pivot than the said pivotal connection, a driven shaft, and a single ratchet wheel secured thereto and adapted to be engaged by each of the pawls to be rotated thereby, as set forth.

JOSÉ T. PENUELA.

Witnesses:
C. SEDGWICK,
F. W. HANAFORD.